H. REISERT.
APPARATUS FOR CONTROLLING THE FLOW OF LIQUIDS.
APPLICATION FILED FEB. 5, 1912.
1,115,974.
Patented Nov. 3, 1914
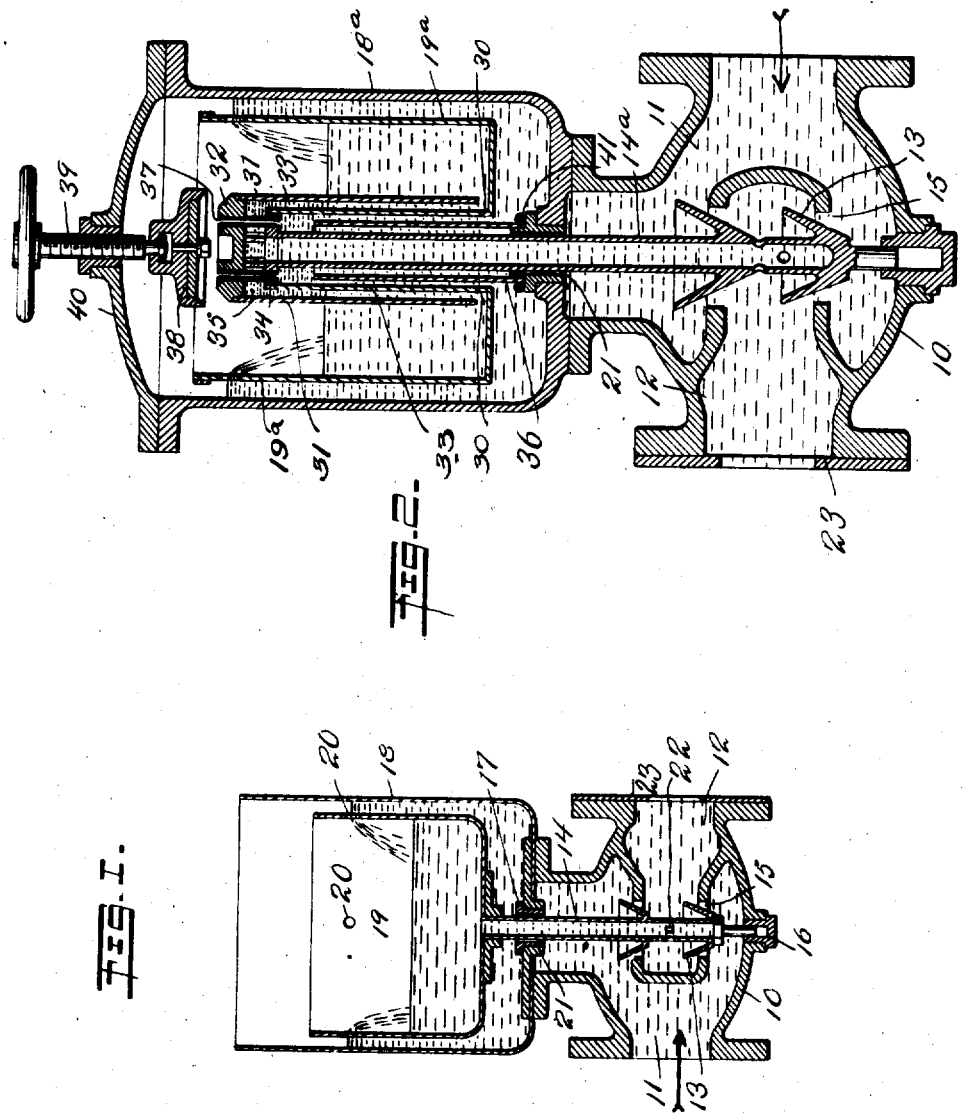

UNITED STATES PATENT OFFICE.

HANS REISERT, OF COLOGNE, GERMANY, ASSIGNOR TO REISERT AUTOMATIC WATER PURIFYING COMPANY, A CORPORATION OF NEW JERSEY.

APPARATUS FOR CONTROLLING THE FLOW OF LIQUIDS.

1,115,974.  Specification of Letters Patent.  Patented Nov. 3, 1914.

Application filed February 5, 1912. Serial No. 675,501.

*To all whom it may concern:*

Be it known that I, HANS REISERT, a subject of the Emperor of Germany, residing at Cologne, Germany, have invented certain new and useful Improvements in Apparatus for Controlling the Flow of Liquids, of which the following is a specification.

This invention relates to means whereby constant quantities of water per unit of time may be delivered from pipe-systems with fluctuating water-pressure, filters in which there is a progressive clogging and opposition to the flow of liquid, or from tanks or reservoirs with water levels of varying or decreasing heights.

The object of the invention is to provide a novel apparatus of this character, which will be efficient in operation and have the greatest simplicity of construction consistent with the objects to be attained.

A particular object of the invention is to control a variably-opening valve or passage so as to automatically compensate for varying pressures by means of a float which is placed in a by-pass around the valve.

Another particular object of the invention is to control the flow of water by means of a variably-opening valve or passage which is operated by an open float, which is filled more or less with liquid according to the variations in pressure.

A further object is to so construct the apparatus for controlling the rate of flow that it enables the source of supply or pipe-system to be completely drained, and is itself self-draining.

A further object is to provide manually-operated means whereby the apparatus may be completely closed, but may not be manually opened thereby.

The invention consists in the parts, improvements and combinations hereinafter described and illustrated in connection with the preferred embodiments thereof and more particularly pointed out in the appended claims.

In the accompanying drawings illustrating the invention: Figure 1 is a vertical section through one form of apparatus; and Fig. 2 is a similar view of another form of apparatus.

Numerous other embodiments of the invention may be devised.

The means for controlling the flow of water or other liquid is preferably embodied in a self-contained apparatus, which may be installed in connection with any filter, tank or other system; but it will be obvious that the parts may be constructed and arranged in other ways.

The two illustrated forms of controlling device will now be described briefly.

In Fig. 1, 10 indicates a suitable form of housing, affording a passage, or a section of a passage, through which the water to be delivered must flow. This housing is shown as containing two chambers 11 and 12, the former being at the up-stream or source side of the valve 13, and the other at the down-stream side thereof. The chamber 11 has a suitable flange whereby it may be secured to the outlet from a filter, tank, reservoir or pipe-system. The chamber 12 is similarly adapted to be connected with a delivery or distributing pipe or system or receiving receptacle. The chamber 12 is provided with any suitable form of controllable device, such as a gate valve for throttling the outflow therefrom. This device may be set for any desired rate of delivery. It is indicated diagrammatically at 23. The valve 13 may be of any suitable form, but preferably comprises two cones mounted on a vertical stem 14, these cones coöperating with openings 15 in horizontal walls separating the two chambers. The lower end of the stem 14 is shown as received in a suitable guide 16, and the upper part of the stem is shown as passing loosely through a guide 17 inserted in the top wall of the chamber 11. 18 is a float-container, the same being preferably mounted upon and over the housing 10. Within the float-container is a float 19; and connections are provided whereby this float operates the valve 13. While any suitable form of connections may be employed, I prefer to secure the valve stem 14 to the float, the arrangement shown being such that rising of the float opens or increases the opening of the valve-controlled passages, and the descent of the float diminishes the opening or closes the same. In accordance with the preferred form of the invention, the float is located in a by-pass around the valve. In the particular construction illustrated this is effected by providing communication between the chamber 11 at the source side of the valve and the interior of the float-container 18, and by making the float open, with inlets from the float-container and a communication with the chamber 12 at the down-stream side of the valve. The inlet from the chamber 11 to the float-container 18 is afforded by the annular space between the stem 14 and the guide 17. The inlet communication from the float-container to the interior of the float 19 is afforded by means of one or more weep-openings 20 disposed at a certain height in the float, above the discharge of the inlet 21 to the float-container. The stem 14 is hollow, and communicates at its upper end with the interior of the float, and at its lower end with the chamber 12, by means of one or more small openings 22. The total area of the weep-openings 20 is preferably equal to or greater than the area of the inlet 21 to the float-container, and the openings 22 are preferably of a combined area equal to or greater than the area of the opening 21.

In operation, assuming that the float-container 18 is empty, the float down and the valve 13 closed, water enters the chamber 11 and is forced upward through the inlet 21 into the float-container 18, where it rises and lifts the float, so as to open the valve. Water now flows into the chamber 12, and by virtue of the throttling at 23 and the resulting back-pressure enters the holes 22 and rises upward through the stem 14 into the interior of the float, thereby weighting the latter. The water in the float-container enters the float through the weep-openings 20. An equilibrium is now established for the pressures obtaining at the time, water from the up-stream side of the valve entering the float-container and thence passing through the weep-holes into the interior of the float, from which it escapes more or less rapidly according to the amount of back-pressure in the chamber 12. The valve is thus held at a certain degree of opening, permitting the water to flow past the same at the desired rate. The water in the float-container 18 remains approximately at the level of the weep-openings. A decrease in pressure at the down-stream side of the valve, resulting from a decrease of pressure or head at the up-stream or source side thereof, enables more water to flow out of the interior of the float, while at the same time the flow of water through the weep-holes 20 into the float is somewhat diminished; the result being that the float rises sufficiently to increase the opening of the valve to an extent where the desired outflow from the device is again secured and equilibrium is reëstablished. An increase in pressure has the reverse results. The water column from the central line between the valve openings 15 to the level of the water in the interior of the float, remains approximately constant.

The form of apparatus shown in Fig. 2, is similar to the preceding, and features common to both and bearing similar reference characters will not again be described. In this form of the invention I provide means for trapping a sufficient quantity of water in the float-container 18ᵃ to keep the float at such height that the valve 13 remains open when the last quantities of water are being drained from the source of supply, and the pressure in the chamber 11 has therefore fallen so low that it would no longer preserve a depth of water in the container. I also provide means for automatically draining the regulating apparatus. In this form of the invention, also, I show manual means for closing the valve and the by-pass so that the apparatus may be absolutely closed, this means being incapable of operation to open the valve. I shall now describe briefly the preferred construction illustrated, but it will be understood that numerous other embodiments may be devised. The float 19ᵃ is annular in cross-section. It has inside of it concentric tubular walls 30 and 31. Of these the inner wall 30 is joined in a water-tight manner to the bottom of the float 19ᵃ, around the central opening therein. The outer wall 31 is secured to a head or block 32 carried by the float, and depends into the water space therein, with its lower end somewhat above the bottom thereof, so that an inlet to the annular space 33 between the walls 30 and 31 is afforded in the lower part of the float. The hollow stem or conduit 14ᵃ extends upward for a sufficient height to be secured to a plate 34 connecting it with the wall 30. A chamber 35 is formed between the head 32 and this plate 34, and places the upper end of the stem 14ᵃ in communication with the upper end of the annular space 33. In this way, a siphon connection is afforded between the interior of the float and the chamber 12, so that all the water in the float will be sucked out when the source of supply is being drained. From around the passage 21 a tube 36 extends upward between the stem 14ᵃ and the wall 30; so that annular spaces are afforded between the tube 36 and the stem on the one hand and between the tube and the wall 30 on the other. The water entering the float-container must first pass up through the inner annular space and then down through the outer one. In this way, a siphon connection would be established between the chamber 11 and the interior of the float-container. In order that, when the pressure in the chamber 11 falls very low owing to the draining of the source of supply, the water may not be sucked out of the float-container so as to cause the valve 13 to close before draining of the source of supply is completed, I provide an air-admission opening or openings to the crown of this siphon. These openings are preferably afforded by means of hollow pins or bolts 37. Thus, during draining, the water in the float-container is trapped and cannot fall below the level of the upper end of the tube 36. This quantity of water is sufficient to hold the float up with the valve open, the float having been emptied by suction in the manner already described. Means are provided for closing the air-admission openings in the bolts 37 to the siphon inlet of the float-container. This means is preferably embodied in a disk 38 having a packing face adapted to be pressed down over the tops of these openings. This disk may be operated manually by means of a screw 39 passing through a cover 40, which closes the float-container so as to prevent access to the interior thereof. In the preferred construction, the member 38 also serves to close the by-pass to force the double valve 13 against its seats. Closing of the valve is accomplished by virtue of the fact that depression of the float forces the stem 14ª downward thus pressing the two cones against their seats. Closing of the by-pass is preferably effected by closing the inlet from the chamber 11 to the float-container. To this end I provide a packing-ring 41 around the base of the tube 36, which is contacted by the bottom of the float when the latter is depressed by the member 38, so that the space between the tube 36 and the wall 30 is cut off from the interior of the float-container. In addition to this, the air-admission openings in the bolts 37 are closed. Thus, the whole apparatus is completely closed, so that water can neither pass the valve, nor enter the float-container, nor escape through the openings in the hollow bolts 37. Since upward movement of the member 38 by means of the screw 39 merely separates this member from the float, it follows that the member and screw constitute an embodiment of manual means whereby the valve may be closed, but may not be opened. The operation of this form of the invention is, in essential aspects, similar to that of the preceding construction.

The operation of the drainage and closure insuring features has been described with the description of the structure.

What is claimed as new is:

1. Apparatus for delivering a uniform flow of liquid, having a variably-opening valve past which the liquid to be delivered must flow, a by-pass around the valve, a float in the by-pass, and connections whereby the float operates the valve.

2. Apparatus for delivering a uniform flow of liquid, having a passage for the liquid to be delivered, a variably-opening valve controlling the same, a float, connections whereby the float operates the valve, a float-container, an inlet communication to the float-container from the part of the apparatus at the source side of the valve, and an outlet communication between the float-container and said passage at a point beyond the valve.

3. Apparatus for delivering a uniform flow of liquid, having a variably-opening valve past which the liquid to be delivered must flow, a float, connections whereby the float operates the valve, a float-container, an inlet communication to the float-container from the part of the apparatus at the source side of the valve, and an outlet from the float-container through which the liquid therefrom flows during the operation of the float and valve.

4. Apparatus for delivering a uniform, regulable flow of liquid, having a variably-opening valve past which the liquid to be delivered must flow, means for throttling the flow of liquid after passing said valve, a by-pass around the valve, a float in the by-pass, and connections whereby the float operates the valve.

5. Apparatus for delivering a uniform flow of liquid, comprising a passage, a variably-opening valve controlling said passage, a float, connections whereby the float operates the valve, a float-container, and separate communications between the float container and the portions of the passage at opposite sides of the valve.

6. Apparatus for delivering a uniform flow of liquid, having a passage, a variably-opening valve controlling the same, a float-container having an inlet thereto, an open float having inlets from the float-container into its interior, a communication between the interior of the float and the passage at the down-stream side of the valve, and connections whereby the float operates the valve.

7. Apparatus for delivering a uniform flow of liquid, having a passage, a variably-opening valve controlling the same, a float-container having an inlet thereto, an open float having inlets from the float-container into its interior, an outlet from the interior of the float, and connections whereby the float operates the valve.

8. Apparatus for delivering a uniform flow of liquid, having a variably-opening valve, a float-container, an open float therein, connections whereby the float operates the valve, and a by-pass around the valve including the float-container and the interior of the float.

9. Apparatus for controlling the flow of water, comprising a passage for the water, a valve therein, a water chamber communicating with said passage, a float therein open to the atmosphere, connections between the float and the valve whereby the float varies the degree of opening of said passage, and means whereby the float is weighted by a varying quantity of the water the flow of which is to be controlled so as to preserve a uniform flow through the valved passage.

10. Apparatus for controlling the flow of water, comprising a passage for the water, a valve therein, a water chamber communicating with said passage, a float therein open to the atmosphere, connections between the float and the valve whereby the float varies the degree of opening of said passage, and means for admitting and withdrawing a portion of the water the flow of which is to be controlled from the interior of the float so as to compensate for variations in pressure at the source side of the valve.

11. Apparatus for controlling the flow of liquid, comprising a valved passage, an open float having an inlet and an outlet, connections whereby the float varies the degree of opening of said passage, and means whereby the inflow and outflow of the float are varied in accordance with fluctuations in pressure in the liquid the flow of which is to be controlled so as to vary the quantity of liquid in the float and thereby cause the latter to vary the degree of opening of the passage so as to compensate for said fluctuations.

12. Apparatus for controlling the flow of liquid, comprising a valved passage, an open float, means for causing liquid to enter the same, means whereby the outflow from the float is varied in accordance with variations in pressure in the liquid the flow of which is to be controlled, and connections whereby the float varies the degree of opening of said passage.

13. Apparatus for controlling the flow of a liquid, comprising a valved passage for the liquid, an open float which receives a portion of the said liquid the flow of which is to be controlled, and a communication permitting the flow of such portion of the liquid between the interior of the float and the down-stream side of the valved passage.

14. Apparatus for delivering a uniform flow of liquid, having a passage, a variably-opening valve controlling the same, a float-container, an inlet to the float-container from the source side of the valve, a float having at a certain height an inlet to its interior from the float-container, and a depending hollow valve stem carried by the float and communicating with the interior thereof, said valve stem carrying said valve and having an opening in its lower part communicating with the passage at the opposite side of the valve.

15. Apparatus for delivering a uniform flow of liquid, having a passage, a variably opening valve controlling the same, a float-container, an inlet to the float-container from the source side of the valve, a float having at a certain height an inlet to its interior from the float-container, and a depending hollow stem carried by the float and communicating with the interior thereof, said stem operating said valve and having an opening in its lower part communicating with the passage at the opposite side of the valve.

16. Apparatus for delivering a uniform flow of liquid, having a passage, a variably-opening valve controlling the same, a float-container having an inlet thereto, a valve-operating float having at a certain height an inlet to its interior from the float-container, and a depending conduit carried by the float and communicating at its lower end with the passage at the down-stream side of the valve.

17. Apparatus for delivering a uniform flow of liquid, having a passage, a variably-opening valve controlling the same, a float-container, an inlet to the lower part of the float-container from the source side of the valve, a float having weep-openings at a certain height, and a depending conduit carried by the float and communicating at its lower end with the passage at the down-stream side of the valve.

18. Apparatus for controlling the flow of a liquid, comprising a valve housing, a valve therein, there being chambers in the housing at opposite sides of the valve, a float-container above the housing, communication between the float-container and the chamber at the source side of the valve, an open valve-operating float in the float-container having weep-openings at a certain height, and a depending hollow stem carried by said float and dipping at its lower end into the other chamber, with which as well as with the interior of the float it is in communication.

19. Apparatus for controlling the flow of a liquid comprising a housing having two chambers, a variably-opening valve between said chambers, a float-container above the housing, a wall separating said container from the up-stream chamber, an open float having weep-openings at a certain height, and a hollow depending valve stem carried by the float and entering the down-stream chamber with which as well as with the interior of the float it is in communication, said valve-stem passing loosely through said wall and thereby affording communication between said up-stream chamber and the float-container.

20. Apparatus for delivering a uniform flow of water, having a passage, a variably-opening valve controlling the same, a float-container having an inlet thereto, an open float operatively connected with the valve and provided with an inlet to its interior from the float-container, and a siphon connection between the interior of the float and the passage at the down-stream side of the valve.

21. Apparatus for delivering a uniform flow of water, having a passage, a variably-opening valve controlling the same, a float-container having an inlet thereto, an open float provided with an inlet to its interior from the float-container, connections whereby the float in rising increases the opening of the valve and in descending diminishes the same, and a communication between the interior of the float and the passage at the down-stream side of the valve, said inlet to the float-container being so constructed and arranged that a sufficient quantity of liquid is trapped in the container to hold the valve open when the pressure at the source side of the valve falls owing to the draining of the apparatus or system supplying the passage.

22. Apparatus for delivering a uniform flow of water, having a passage, a variably-opening valve controlling the same, a float-container, a siphon inlet to the float-container from the source side of said valve, an open float provided with an inlet to its interior from the float-container, connections whereby the float operates the valve, and a communication between the interior of the float and the passage at the opposite side of the valve.

23. Apparatus for delivering a uniform flow of water, having a passage, a variably-opening valve controlling the same, a float-container, a siphon inlet to the float-container from the source side of said valve, said siphon inlet having air-admission openings in its crown, an open float provided with an inlet to its interior from the float-container, connections whereby the float operates the valve, and a communication between the interior of the float and the passage at the opposite side of the valve.

24. Apparatus for delivering a uniform flow of water, having a passage, a variably-opening valve controlling the same, a float-container, a siphon inlet to the float-container from the source side of said valve, said siphon inlet having air-admission openings in its crown, means for closing said openings, an open float provided with an inlet to its interior from the float-container, connections whereby the float operates the valve, and a communication between the interior of the float and the passage at the opposite side of the valve.

25. Apparatus for delivering a uniform flow of water, having a passage, a variably-opening valve controlling the same, a float-container having an inlet thereto, an open float provided with an inlet to its interior from the float-container, connections whereby the float in rising increases the opening of the valve and in descending diminishes the same, and a communication between the interior of the float and the passage at the down-stream side of the valve, said inlet to the float-container being so constructed and arranged that a sufficient quantity of liquid is trapped in the container to hold the valve open when the pressure at the source side of the valve falls owing to the draining of the apparatus or system supplying the passage, and manual means for closing the valve.

26. Apparatus for delivering a uniform flow of liquid, having a variably-opening valve past which the liquid to be delivered must flow, a by-pass, a float in the by-pass, connections whereby the float operates the valve, and means for closing the by-pass.

27. Apparatus for delivering a uniform flow of liquid, having a variably-opening valve past which the liquid to be delivered must flow, a float, connections whereby the float operates the valve, a float-container, an inlet communication to the float-container from the part of the apparatus at the source side of the valve, means for closing said inlet, and an outlet from the float-container through which the liquid therefrom flows during the operation of the float and valve.

28. Apparatus for delivering a uniform flow of liquid, having a passage, a variably-opening valve controlling the same, a float-container, a siphon inlet to the float-container, said siphon inlet having air-admission openings in its crown, an open float operatively connected with the valve and having an inlet to its interior from the float-container, a communication between the interior of the float and the passage at the down-stream side of the passage, and means for closing the inlet to the float-container, said air-admission openings and the valve.

29. Apparatus for delivering a uniform flow of liquid, having a passage, a variably-opening valve controlling the same, a float-container, a siphon inlet to the float-container, said siphon inlet having air-admission openings in its crown, an open float operatively connected with the valve and having an inlet to its interior from the float-container, a communication between the interior of the float and the passage at the down-stream side of the passage, and a valve-like member and means for operating it, said member being adapted to be forced down against the top of the float so as to close said air-admission openings and depress the float so as to close the valve and the inlet to the float-container.

30. Apparatus for controlling the rate of flow of a liquid, comprising a passage, a variably-opening valve controlling the same, a by-pass around the valve, an inclosed float-container in said by-pass, a float, connections whereby the float operates the valve, and manual means whereby the valve may be operated for closing only.

31. Apparatus for controlling the rate of flow of a liquid, comprising a passage, a variably-opening valve controlling the same, a by-pass around the valve, an inclosed float-container in said by-pass, a float, connections whereby the float operates the valve, and manual means adapted to act on the float to move it in the direction for closing the valve only.

32. Apparatus for delivering a uniform flow of liquid, having a passage, a variably-opening valve controlling the same, a float-container having an inlet thereto, an open float having weep-openings at a certain height, connections whereby said float operates the valve, inner and outer tubular walls within the float, the inner of these walls being joined in a liquid-tight manner to the bottom of the float and the outer wall affording an entrance at the lower part of the interior of the float to the annular space between the walls, and a depending tube carried by the float and communicating at its upper end with the upper end of said annular space, said tube being in communication at its lower end with said passage at the down-stream side of the valve.

33. Apparatus for delivering a uniform flow of liquid, having a passage, a variably-opening valve controlling the same, a float-container, an open annular float having weep-openings at a certain height, connections whereby the float operates the valve, inner and outer tubular walls within the float, the inner of these walls being joined in a liquid-tight manner to the bottom of the float and the outer wall affording an entrance at the lower part of the interior of the float to the annular space between the walls, a depending tube carried by the float and communicating at its upper end with the upper end of said space and at its lower end with said passage at the down-stream side of the valve, said tube passing through the bottom of the float-container and said bottom having an inlet opening around said tube, and a tube extending upward from around said opening between the depending tube and said inner tubular wall, there being spaces between the upward-extending tube and the depending tube and between the upward-extending tube and the said inner wall through which the liquid enters the float-container.

34. Apparatus for delivering a uniform flow of liquid, comprising a valved passage, an open float, connections whereby the float varies the degree of opening of said passage, means for causing liquid to flow into said float, and a communication between the interior of the float and the down-stream side of the passage.

35. Apparatus for delivering a uniform flow of liquid, comprising a valved passage, an open float, connections whereby the float varies the degree of opening of said passage, a communication whereby liquid flows into said float from the part of the apparatus at the source side of said passage, and an outlet from said float.

In testimony whereof, I have signed my name to this specification, in the presence of two subscribing witnesses.

HANS REISERT.

Witnesses:
 LOUIS VANDORY,
 BESSIE F. DUNLAP.